United States Patent
Lee et al.

(10) Patent No.: US 6,466,289 B1
(45) Date of Patent: Oct. 15, 2002

(54) LIQUID CRYSTAL DISPLAYS HAVING COMMON ELECTRODE OVERLAP WITH ONE OR MORE DATA LINES

(75) Inventors: Kyeong-Nam Lee; Woon-Yong Park, both of Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 52 days.

(21) Appl. No.: 09/643,497

(22) Filed: Aug. 22, 2000

Related U.S. Application Data

(63) Continuation of application No. 09/212,161, filed on Dec. 15, 1998, now Pat. No. 6,133,977, which is a continuation-in-part of application No. 08/955,852, filed on Oct. 21, 1997, now Pat. No. 5,907,379.

(30) Foreign Application Priority Data

May 15, 1998 (KR) .............................. 98-17518

(51) Int. Cl.$^7$ ............................................ G02F 1/1343
(52) U.S. Cl. ...................................... 349/141; 349/147
(58) Field of Search ................................. 349/141, 147, 349/143, 110, 111

(56) References Cited

U.S. PATENT DOCUMENTS

| | | | |
|---|---|---|---|
| 4,804,953 A | 2/1989 | Castleberry | 349/54 |
| RE33,829 E | 2/1992 | Castleberry | 349/54 |
| 5,107,355 A | 4/1992 | Satoh et al. | 359/87 |
| 5,162,931 A | 11/1992 | Holmberg | 359/54 |
| 5,212,574 A | 5/1993 | Katayama et al. | 359/59 |
| 5,334,860 A | 8/1994 | Naito | 257/59 |
| 5,598,285 A * | 1/1997 | Kondo et al. | 349/39 |
| 5,731,856 A | 3/1998 | Kim et al. | 349/43 |
| 5,745,207 A | 4/1998 | Asada et al. | 349/141 |
| 5,754,266 A * | 5/1998 | Ohta et al. | 349/139 |
| 5,796,449 A | 8/1998 | Song | 349/54 |
| 5,852,485 A | 12/1998 | Shimada et al. | 349/141 |
| 5,907,379 A | 5/1999 | Kim et al. | 349/141 |
| 5,978,057 A | 11/1999 | Oh | 349/139 |
| 6,266,117 B1 * | 7/2001 | Yanagawa et al. | 349/141 |

* cited by examiner

Primary Examiner—Kenneth Parker
(74) Attorney, Agent, or Firm—Myers Bigel Sibley & Sajovec

(57) ABSTRACT

A gate wire including a gate line, a gate electrode and a gate pad, and a common signal wire including a plurality of common electrodes and a common signal line connecting the common electrodes are formed on a substrate. A first data pattern including a first data line defining a pixel region along with the gate line, a source and drain electrode, a first data pad and a pixel wire parallel to the common electrodes is formed on a gate insulating layer covering the gate wire and the common signal wire. A second data pattern including a second data line, a second data pad and a supplementary gate pad, which are connected to the first data line, the first data pad and the gate pad respectively through contact holes formed in a passivation layer, is on the passivation layer. Here, the first or the second data line and the common electrodes adjacent thereto overlap each other to prevent the light leakage near the edges of the pixel region and to increase the aperture ratio of the LCD. The data pattern may have a double-layered structure in order to prevent its disconnections, and the short between the data pattern and the common electrodes adjacent to the second data line is reduced by disposing the gate insulating layer and the passivation layer therebetween. The upper layer of the first or the second data pad and the supplementary gate pad are made of either chromium, molybdenum, molybdenum alloy or ITO to improve the high reliability of the contact property.

13 Claims, 5 Drawing Sheets

LIQUID CRYSTAL DISPLAYS HAVING COMMON ELECTRODE OVERLAP WITH ONE OR MORE DATA LINES

CROSS-REFERENCE

This application is a continuation of U.S. application Ser. No. 09/212,161, filed Dec. 15, 1998, now U.S. Pat. No. 6,133,977 which is a continuation in part of U.S. application Ser. No. 08/955,852, filed Oct. 21, 1997, U.S. Pat. No. 5,907,379. The disclosures of U.S. application Ser. No. 09/212,161 and U.S. application Ser. No. 08/955,852, U.S. Pat. No. 5,907,379, are hereby incorporated herein by reference.

BACKGROUND OF THE INVENTION (a) Field of the Invention

The present invention relates to a liquid crystal display (LCD), more specifically to an LCD having an electrode array for generating electric fields in a signal substrate.

(b) Description of the Related Art

A liquid crystal display having an electrode array for generating an electric field which is parallel to both substrates (IPS-mode in-plane switching mode) is described in U.S. Pat. No. 5,598,285. However, this IPS-mode LCD has several problems.

The first problem is that the height difference of the two electrodes, a common electrode and a pixel electrode used for generating electric fields, causes uneven rubbing of an alignment layer, which results in the light leakage.

The second problem is that the potential difference between a data line applying data signals to the pixel electrode, and the common electrode in the region between them may cause some light leakage and the light leakage is also causing the lateral cross talk.

To prevent any light leakage, the width of a black matrix along the perimeter of a pixel region may be widened, or the gap between the common electrode and the data line may be narrowed. However, the aperture ratio of the LCD is reduced when the black matrix is widened, and the common electrode and the data line may easily short when the gap between the common electrode and the data line is made smaller.

The third problem is that the contact property of pads connected to signal lines, which are usually made of an aluminum or an aluminum alloy having low resistivity, is poor, because the aluminum or aluminum alloy, when exposed, is easily oxidized.

SUMMARY OF THE INVENTION

In view of the above, it is an object of the present invention to prevent any light leakage in an LCD.

It is another object of the present invention to reduce the disconnections of the signal lines and to prevent the shorts between a data line and a common electrode.

It is another object of the present invention to increase the aperture ratio of an LCD and to improve the contact property of the pads.

These and other objects, features and advantages are provided, according to the present invention, by making a data line to have a double-layered structure, and by overlapping common electrodes adjacent to the data line with one layer of the data line.

The data line may include a lower layer, which is made of the same layer as a pixel electrode, and an upper layer formed of a pad material which is not easily broken in the manufacturing process.

To provide these and other objects, features and advantages, in the substrate for an IPS-mode LCD according to the present invention, are provided by including a gate line and an array of common electrodes formed on a transparent insulating substrate, and a first insulating layer covering the gate line and the common electrodes. A first and a second data lines, are formed on the first insulating layer. The first and the second data lines overlap each other and are connected to each other through a first contact hole formed in a second insulating layer interposed between the first and the second data lines. The first and the second data lines intersect the gate line. A plurality of pixel electrodes parallel to the common electrodes are formed on the first and the second insulating layer. The common electrodes adjacent to the first and second data lines, overlap the first or the second data line via the first and the second insulating layer, and the pixel electrodes may be connected to either the first or the second data line. Furthermore, a first and a second data pads, which are connected to the first and the second data lines, respectively, are connected to each other through a second contact hole formed in the second insulating layer, and a supplementary gate pad is connected to a gate pad connected to the gate line, through a third contact hole formed in the first insulating layer.

The first or the second data line and the common electrodes adjacent thereto, which overlap each other, block the light passing through the region between them, and replace a black matrix.

Furthermore, the short between the first or the second data lines and the common electrodes, is decreased, because the first and second insulating layers are interposed between the common electrodes and the first and the second data lines. The disconnections of the data line are reduced due to its double-layered structure.

The upper one among the first and the second data pads, the gate pad, the supplementary gate pad may be formed of a pad material, which are not easily damaged in the manufacturing process, such as chromium, molybdenum, molybdenum alloy or indium tin oxide (ITO).

DETAILED DESCRIPTION OF THE PREFERRED EMBODIMENTS

Figure 1:
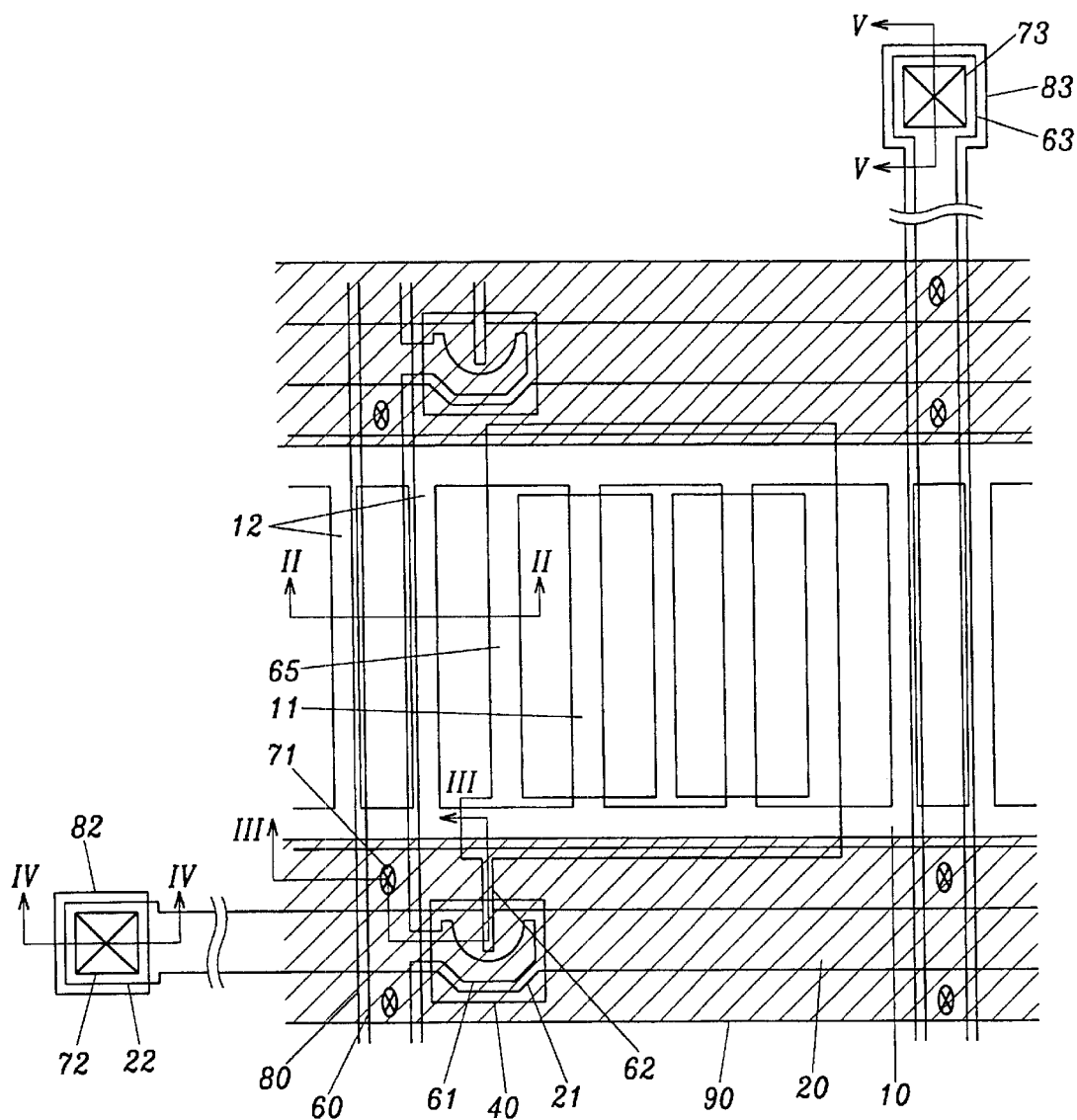
FIG. 1 is a layout view of a substrate for an IPS-mode LCD according to a first embodiment of the present invention.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

FIG. 1 is a layout view of a substrate for an LCD according to the first embodiment of the present invention, FIGS. 2, 3, 4 and 5 are sectional views of the substrate illustrated in FIG. 1 taken along the lines II—II, III—III, IV—IV and V—V, respectively.

As shown in FIGS. 1–5, a gate wire including a transverse gate line 20, a gate electrode 21, which is a part of the gate line 20, and a gate pad 22 connected to the gate line 20 is formed on a substrate 100. A common signal wire including a pair of common signal lines 10 parallel to the gate line 20 and a plurality of linear common electrodes 11 and 12 connected to both the common signal lines 10 is also formed on the substrate 100. The common electrodes 11 and 12 extend longitudinally and are spaced apart from and parallel to each other. The gate wire 20, 21 and 22 and the common signal wire 10, 11 and 12 may have either a single-layered structure made of a conductive material such as chromium, aluminum, aluminum alloy, molybdenum or molybdenum alloy, or a double-layered structure including two layers made of materials selected from two of the above-described conductive materials.

A gate insulating layer 30 covers the gate wire 20, 21 and 22 and the common signal wire 10, 11 and 12, and has a contact hole 72 exposing the gate pad 22.

A channel layer 40 made of a semiconductor such as a hydrogenated amorphous silicon (a-si:H) and an ohmic contact layer 51 and 52 made of hydrogenated amorphous silicon layer doped with N type impurity are sequentially formed on the gate insulating layer 30 opposite the gate electrode 21. The portions 51 and 52 of the ohmic contact layer are opposite each other with respect to the gate electrode 21.

A first data line 60 is formed on the gate insulating layer 30 and extends in the longitudinal direction, and a data pad 63 on the gate insulating layer 30 is connected to the first data line 60.

A U-shaped source electrode 61 connected to the first data line 60, and a drain electrode 62 are formed on the respective portions 51 and 52 of the ohmic contact layer. The drain electrode 62 is connected to a pixel wire 65 including a pair of pixel signal line portion parallel to the common signal line 10, and a plurality of pixel electrode portions which are parallel to the common electrodes 11 and spaced apart from each other.

A first data pattern 60, 61, 62, 63 and 65 may be made of one selected from chromium, aluminum, aluminum alloy, molybdenum and molybdenum alloy. It is preferable that the thickness of the first data pattern 60, 61, 62, 63 and 65 is equal to or less than about 500 Å, because the light leakage due to an uneven rubbing of the alignment layer may be reduced by minimizing the height of the pixel wire 65.

A thin film transistor (TFT) includes the gate electrode 21, the gate insulating layer 30, the channel layer 40, the ohmic contact layer 51 and 52, and the source and the drain electrodes 61 and 62.

A passivation layer 70 made of silicon nitride is formed over the thin film transistor and the first data pattern 60, 61, 62, 63 and 65. The passivation layer 70 has contact holes 71 and 73 exposing the first data line 60 and the first data pad 63, respectively, and the passivation layer 70 and the gate insulating layer 30 has a contact hole 72 exposing the gate pad 22.

Figure 2:
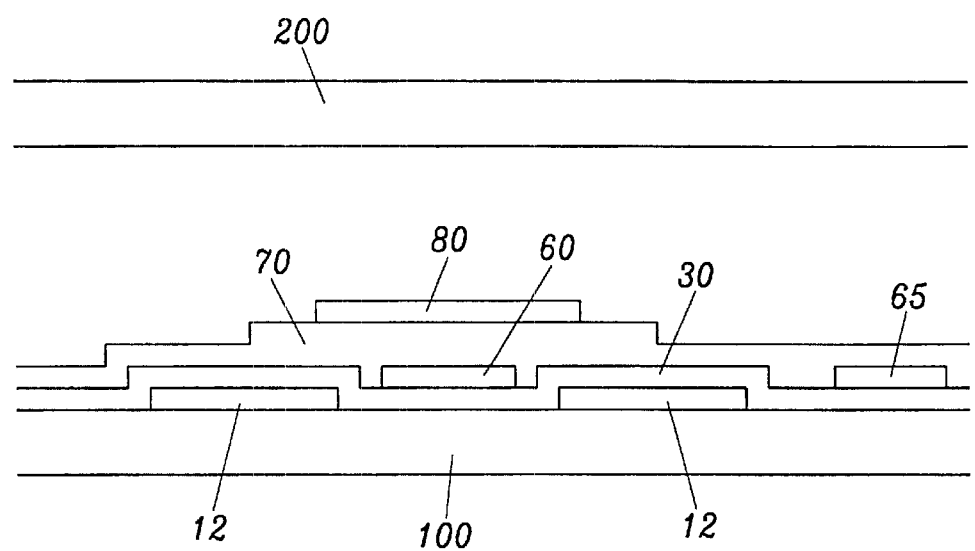
FIG. 2 shows a cross-sectional view of the substrate illustrated in FIG. 1 taken along the line II—II.
Figure 3:
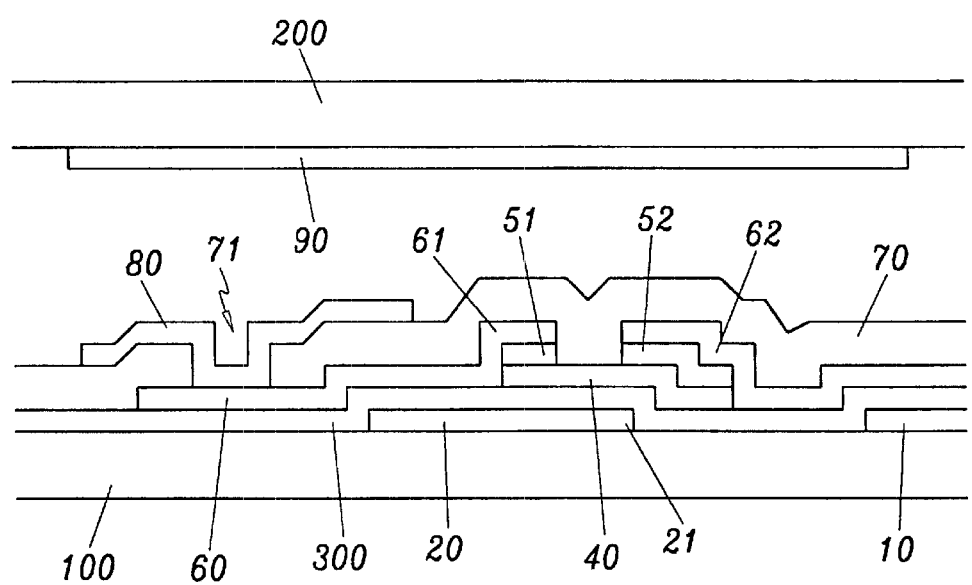
FIG. 3 shows a cross-sectional view of the substrate illustrated in FIG. 1 taken along the line III—III.
Figure 4:
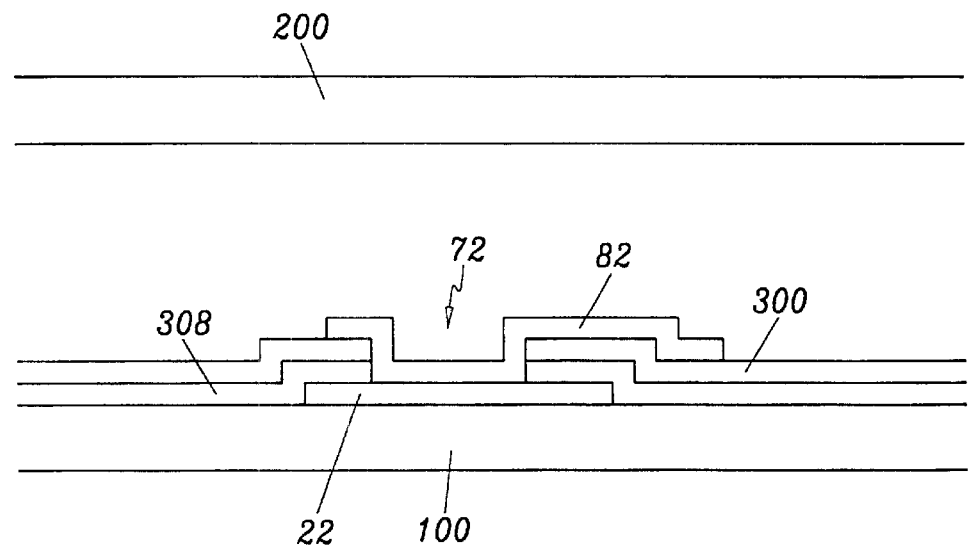
FIG. 4 shows a cross-sectional view of the substrate illustrated in FIG. 1 taken along the line IV—IV.
Figure 5:
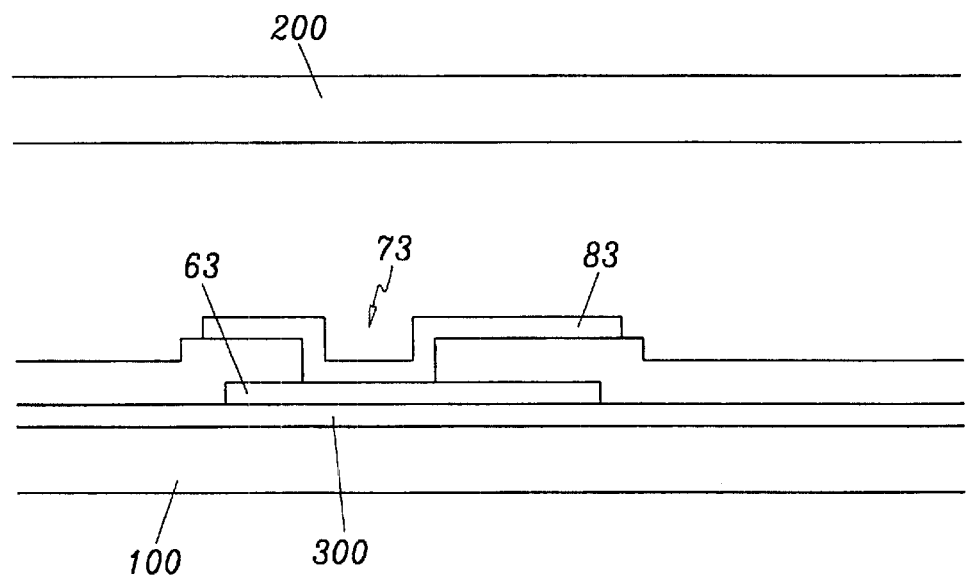
FIG. 5 shows a cross-sectional view of the substrate illustrated in FIG. 1 taken along the line V—V.

The second data pattern 80 and 83, which is connected to the first data pattern 60 and 63 through the contact holes 71 and 73 respectively, is formed on the passivation layer 70 and extends along the first data pattern 60 and 63. Furthermore, a supplementary gate pad 82 connected to the gate pad 22 through the contact hole 72 is formed on the passivation layer 70. As shown in FIG. 2, both edges of the second data line 80 overlap the adjacent edges of the two common electrodes 12 adjacent thereto. Accordingly, the second data line 80 and the two common electrodes 12 perform the same function as a black matrix, blocking the light leakage at portions near the first and the second data lines 60 and 80. As shown in FIG. 2, both the passivation layer 70 and the gate insulating layer 30 are interposed between the second data line 80 and the two common electrode 12 overlapping the second data line 80, therefore reducing a short therebetween.

The second data pattern 80, 82 and 83 may have either a single-layered structure made of chromium, aluminum, aluminum alloy, molybdenum or molybdenum alloy, or a double-layered structure including two layers made of materials selected from two of the above-described conductive materials. Since the second data pattern 80, 82 and 83 may have good contact properties at the pad 83, the second data pattern 80, 82 and 83 is preferably made of chromium, molybdenum or molybdenum alloy to benefit from the high reliability of their contact properties. Furthermore, it is preferable that the thickness of the second data pattern 80, 82 and 83 is in the range of 2,000–2,500Å, which is thick, to minimize resistance.

In this and following embodiments, a pixel region is defined by the region enclosed by the gate line 20 and the first and the second data lines 60 and 80.

On the opposing substrate 200, there is a black matrix 90 in the transverse direction. Both edges of the black matrix 90 overlap the common signal line 10 of the lower substrate 100. Accordingly, the transverse length of the pixel region increases in the LCD according to this embodiment without a longitudinal black matrix, and thus the aperture ratio is improved.

In the first embodiment according to this invention, the disconnection of the first data line 60 due to its height difference generated by crossing the gate line 20 is prevented by adding the second data line 80 to have a double-layered structure, and the second data line 80 prevents the light leakage along the common electrodes 12. However, on the contrary, the first data line 60 may be made wider than the second data line 80, and serve as the light blocking film. In this case, the second data line 80 may be made of ITO.

Furthermore, the pixel wire and the source and the drain electrodes may be formed along with the second data line 80 instead of along with the first data line 60. In this case, it is preferable that the second data pattern has a thickness of equal to or less than around 500 Å to prevent the leakage light due to height differences, and since the pads and the pixel wire are formed simultaneously, the pixel wire may be made of chromium, molybdenum, molybdenum alloy or ITO, benefiting from the high reliability of the contact property.

Figure 6:
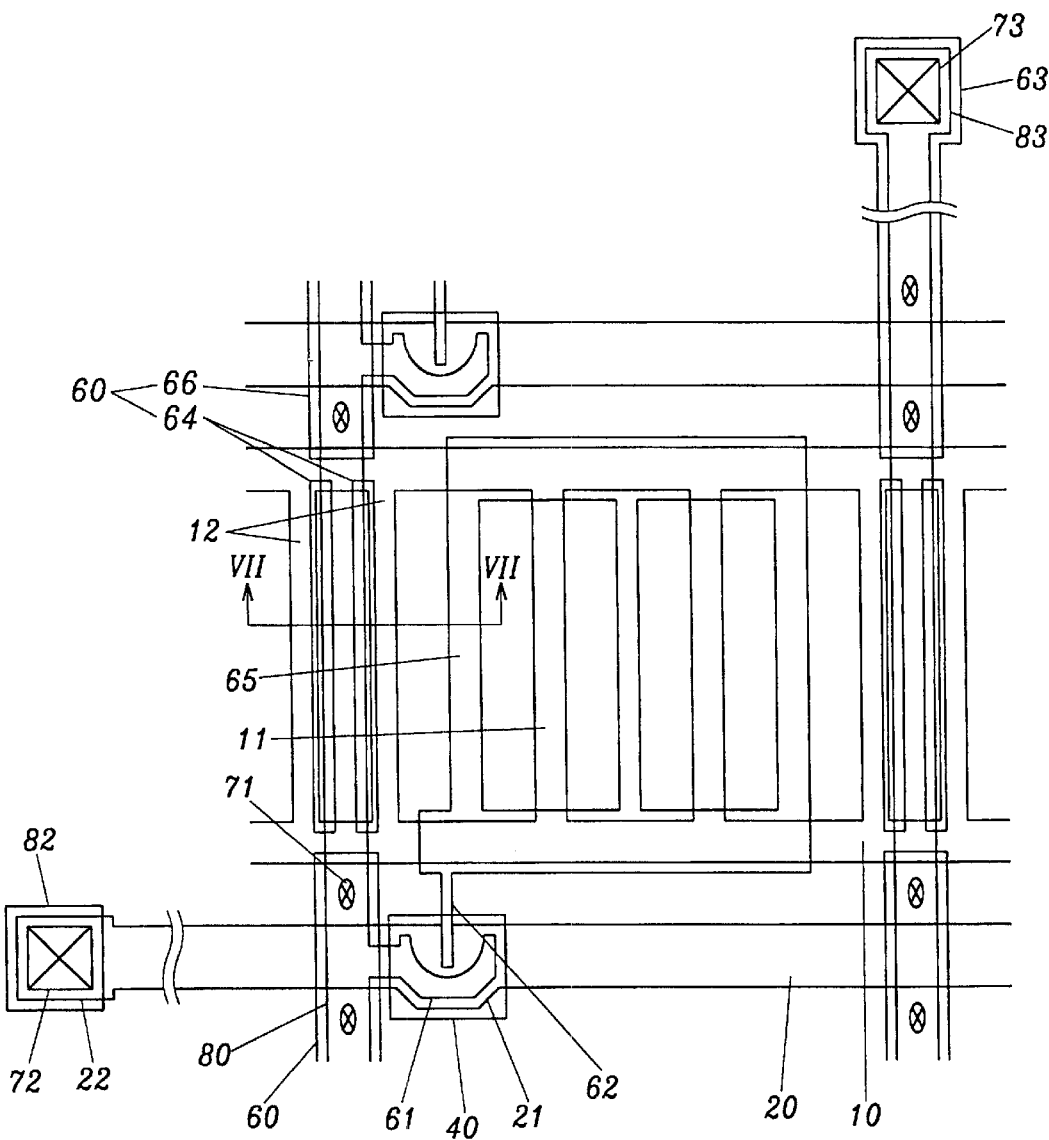
FIG. 6 illustrates a layout view of a substrate for an IPS mode according to a second embodiment of the present invention.
Figure 7:
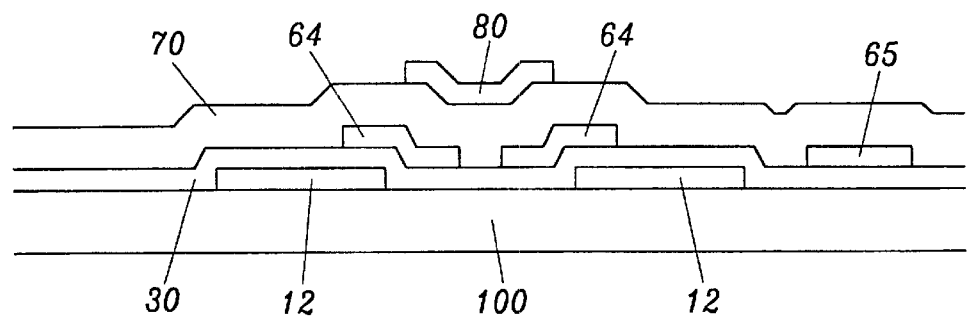
FIG. 7 shows a cross-sectional view of the substrate illustrated in FIG. 6 taken along line VII—VII.

Next, the structure of the substrate for an LCD according to a second embodiment will be described. FIG. 6 is a layout view of a substrate for an LCD according to the second embodiment of the present invention. FIG. 7 shows a cross-sectional view of the substrate illustrated in FIG. 6 taken along the line VII—VII.

The sectional views of the structure that are similar to the first embodiment (e.g., the TFT sections, the gate pad sections, the data pad sections, and the upper substrate) will be omitted. As shown in FIGS. 6 and 7, most of the structure is similar to the first embodiment.

However, the width of a first data pattern 60 and 63 on a gate insulating layer 30 is wider than a second data pattern 80 and 83 on a passivation layer 70. A first data line 60, which is connected to a second data line 80 through a contact hole 71 in the passivation layer 70, includes a first portion 66 shielding 15 the second data line 80, and a second portion 64 preventing the light leakage near the common electrodes 12. As shown in FIG. 7, the second portion 64 of the first data line 60 is divided into two light-shield strips 64, the two light-shield 64 overlap both edges of the second data line 80 via the passivation layer 70, and edges of the adjacent two common electrodes 12 adjacent to the first and second data lines 60 and 80 via the gate insulating layer 30.

In this structure of the second embodiment LCD, the light-shield strips 64 of the data line 60 are located between the second data line 80 and two common electrodes 12, and thereby completely block any oblique light from reaching the substrate 100, and the lateral cross talk of the LCD can be effectively minimized.

A third embodiment of the present invention prevents light leakage by narrowing the space between the data lines and the common electrode adjacent thereto. Details of this third embodiment will follow.

Figure 8:
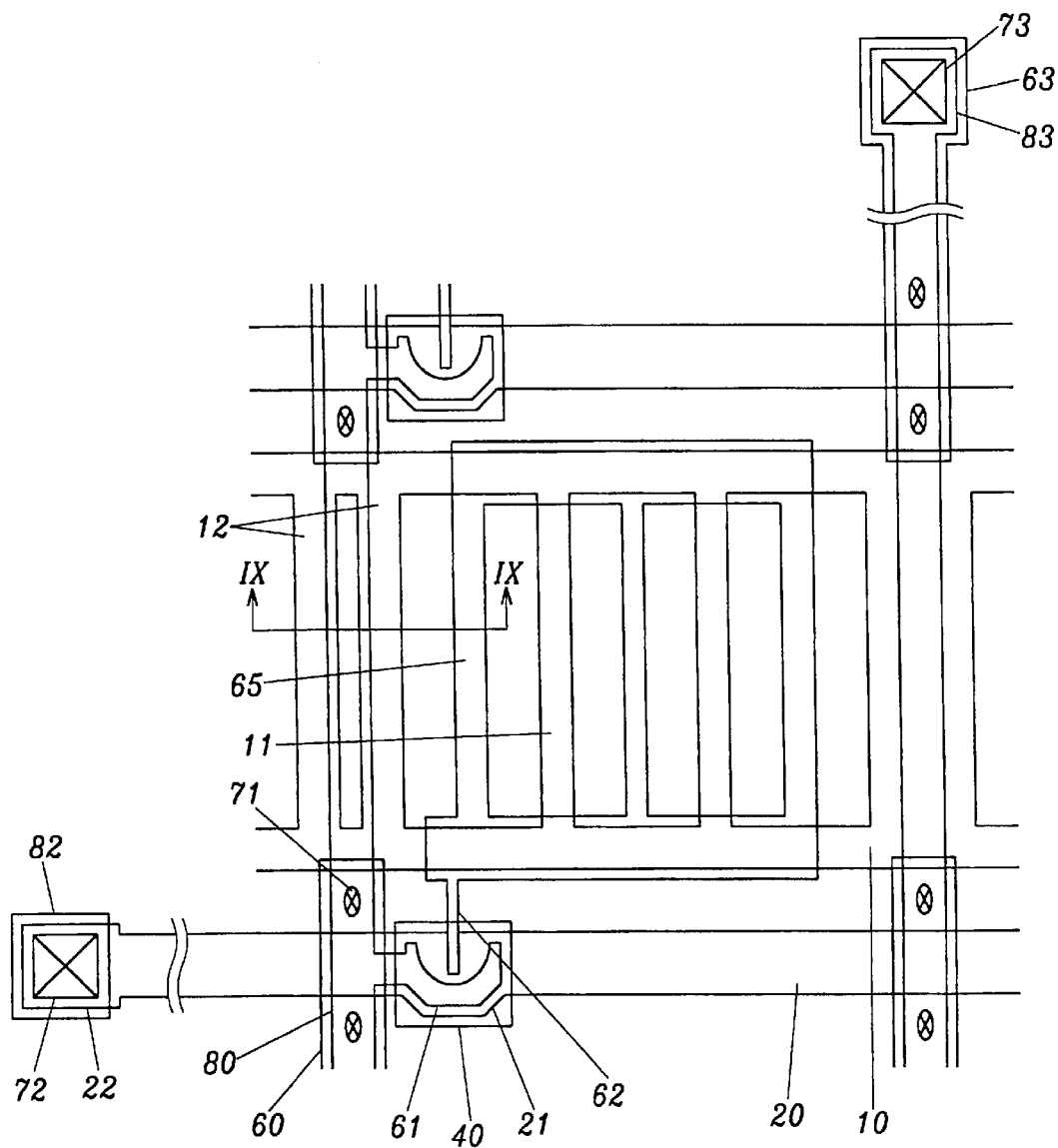
FIG. 8 illustrates a layout view of a substrate for an IPS mode LCD according to a third embodiment of the present invention.
Figure 9:
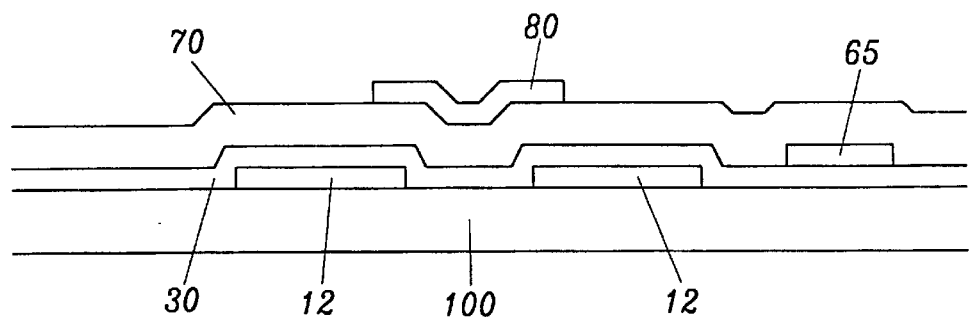
FIG. 9 shows a cross-sectional view of the substrate illustrated in FIG. 8 taken along line IX—IX.

FIG. 8 illustrates a layout view of a substrate for an LCD according to the third embodiment of the present invention. FIG. 9 shows a cross-sectional view of the substrate illustrated in FIG. 8 taken along the line IX—IX.

The sectional views of the structure that are similar to the first embodiment (e.g. the TFT sections, the gate pad sections, the data pad sections, and the upper substrate) will be omitted. As shown in FIGS. 8 and 9, most of the structure is similar to the second embodiment.

However, a first data line 60 on a gate insulating layer 30, which is connected to a second data line 80 on a passivation layer 70 through a contact hole 71, is formed only on the portion of the second data line 80 crossing a gate line 20 without the light-shield strip. The two common electrodes 12 adjacent to the first data line 60 overlap both edges of the first data line 60. The width of the common electrodes 12 may be widened, or the distance between the two common electrodes 12 may be reduced in comparison to the first and the second embodiments.

Because there is no first data pattern on the common electrodes 12 in the third embodiment, the possibility of there being a short between the data lines and the common electrodes 12 is much reduced.

According to the third embodiment of the present invention, it is possible for the data patterns to be free of any disconnections, and still maintain a highly reliable level of contact by forming the data pattern as a double-layered structure. Using the data pattern and the common electrodes adjacent to the data line prevents the light leakage. Accordingly the aperture ratio of the LCD is increases. Furthermore, any possibility of there being a short between the data pattern and the common electrodes adjacent to the data line is reduced by reinforcing the insulation therebetween.

In the drawings and the specification, typical preferred embodiments of the invention have been disclosed and, although specific terms are employed, they are used in a generic and descriptive sense only, and not for purposes of limitation, within the scope of the invention being set forth in the as claims.

What is claimed is:

1. A liquid crystal display, comprising:
    a gate line;
    a data line that comprises a double-layered structure including first and second portions that are electrically connected to each other and at least partially overlap each other and that intersects the gate line and is insulated from the gate line;
    an insulating layer that is disposed between the first and second portions of the data line;
    a plurality of common electrodes that are substantially parallel to each other in a pixel region defined by the gate line and the data line;
    a plurality of pixel electrodes that are substantially parallel to the common electrodes in the pixel region;
    a thin film transistor having a gate electrode, a source electrode, and a drain electrode, which are respectively connected to the gate line, the data line, and the pixel electrodes; and
    a light-shield layer that covers a gap between the data line and at least one of the common electrodes that are adjacent to the data line and the pixel electrodes that are adjacent to the data line.

2. A liquid crystal display as recited in claim 1, further comprising:
    a substrate, the gate line and the plurality of common electrodes being formed on the substrate.

3. A liquid crystal display as recited in claim 2, wherein the first and second portions of the data line are configured such that the second portion is near the substrate and the first portion is remote from the substrate.

4. A liquid crystal display as recited in claim 3, wherein the insulating layer is a first insulating layer, the liquid crystal display further comprising:
    a second insulating layer that is disposed between the second portion of the data line and the common electrodes.

5. A liquid crystal display as recited in claim 1, wherein the first portion of the data line is made from a material selected from the group consisting of chromium, molybdenum, molybdenum alloy, and indium tin oxide (ITO).

6. A liquid crystal display as recited in claim 1, wherein the pixel electrodes are formed on the same layer as one of the first and second portions of the data line.

7. A liquid crystal display, comprising:
    a gate line;
    a data line that intersects the gate line and is insulated from the gate line;
    a plurality of common electrodes that are substantially parallel to each other in a pixel region defined by the gate line and the data line;
    a plurality of pixel electrodes that are substantially parallel to the common electrodes in the pixel region;
    a thin film transistor having a gate electrode, a source electrode, and a drain electrode, which are respectively connected to the gate line, the data line, and the pixel electrodes; and
    a light-shield layer disposed between the data line and at least one of the plurality of common electrodes and pixel electrodes.

8. A liquid crystal display as recited in claim 7, wherein the data line comprises a double-layered structure including first and second portions that are electrically connected to each other and at least partially overlap each other, the liquid crystal display further comprising:

a first insulating layer that is disposed between the first and second portions of the data line.

9. A liquid crystal display as recited in claim 8, further comprising:

a substrate, the gate line and the plurality of common electrodes being formed on the substrate.

10. A liquid crystal display as recited in claim 9, wherein the first and second portions of the data line are configured such that the second portion is near the substrate and the first portion is remote from the substrate.

11. A liquid crystal display as recited in claim 10, further comprising:

a second insulating layer that is disposed between the second portion of the data line and the common electrodes.

12. A liquid crystal display as recited in claim 8, wherein the first portion of the data line is made from a material selected from the group consisting of chromium, molybdenum, molybdenum alloy, and indium tin oxide (ITO).

13. A liquid crystal display as recited in claim 8, wherein the pixel electrodes are formed on the same layer as one of the first and second portions of the data line.

* * * * *